US010627538B2

(12) United States Patent
Hergott

(10) Patent No.: US 10,627,538 B2
(45) Date of Patent: Apr. 21, 2020

(54) OCCUPANCY DETECTION SYSTEMS AND METHODS

(71) Applicant: Jason Hergott, Northbrook, IL (US)

(72) Inventor: Jason Hergott, Northbrook, IL (US)

( * ) Notice: Subject to any disclaimer, the term of this patent is extended or adjusted under 35 U.S.C. 154(b) by 294 days.

(21) Appl. No.: 15/476,216

(22) Filed: Mar. 31, 2017

(65) Prior Publication Data
US 2018/0284319 A1 Oct. 4, 2018

(51) Int. Cl.
| G01V 8/12 | (2006.01) |
|---|---|
| A47C 1/13 | (2006.01) |
| G01V 11/00 | (2006.01) |
| B60R 21/015 | (2006.01) |
| A47C 1/00 | (2006.01) |
| G06K 9/00 | (2006.01) |

(Continued)

(52) U.S. Cl.
CPC .............. *G01V 8/12* (2013.01); *A47C 1/13* (2013.01); *A47C 1/00* (2013.01); *A47C 1/12* (2013.01); *B60N 2/002* (2013.01); *B60R 21/01516* (2014.10); *B60R 21/01526* (2014.10); *B60R 21/01534* (2014.10); *G01V 11/00* (2013.01); *G06K 9/00362* (2013.01)

(58) Field of Classification Search
CPC ... G01V 8/12; G01V 9/00; A47C 1/13; A47C 1/12; A47C 1/00; B60N 2/002; B60R 21/01516; B60R 21/01526; B60R 21/01534; G06K 9/00362
See application file for complete search history.

(56) References Cited

U.S. PATENT DOCUMENTS

| 4,808,809 A * | 2/1989 | Hayakawa | ............... G01V 8/12 |
|---|---|---|---|
| | | | 250/205 |
| 5,075,543 A * | 12/1991 | Courtney | ................. G01V 8/14 |
| | | | 250/223 R |

(Continued)

OTHER PUBLICATIONS

"Detect and stream if a chair is occupied," Arudino Stack Exchange web-based message board, posted in May 2014, available at https://arduino.stackexchange.com/questions/1288/detect-and-stream-if-a-chair-is-occupied(last visited May 9, 2017), 5 pages.

(Continued)

*Primary Examiner* — Jonathan M Dunlap
(74) *Attorney, Agent, or Firm* — Neal, Gerber & Eisenberg LLP

(57) ABSTRACT

The present disclosure provides systems and methods for occupancy detection. In various embodiments, the occupancy detection system includes a server configured to wirelessly communicate with one or more occupancy detectors. Each occupancy detector includes or is associated with an object holder. The object holder can have one of two occupancy states: an occupied state in which an object occupies the object holder or an unoccupied state in which no object occupies the object holder. The occupancy detector includes a sensor and a controller configured to use sensor feedback to determine when the object holder changes occupancy states from the occupied state to the unoccupied state or from the unoccupied state to the occupied state. When the controller determines that the object holder changes occupancy states, the controller generates occupancy data that reflects this changed state and sends it to the server.

19 Claims, 3 Drawing Sheets

(51) Int. Cl.
*B60N 2/00* (2006.01)
*A47C 1/12* (2006.01)

(56) References Cited

U.S. PATENT DOCUMENTS

| | | | | | |
|---|---|---|---|---|---|
| 5,149,921 | A * | 9/1992 | Picado | ................... | B66B 13/26 187/317 |
| 5,732,375 | A * | 3/1998 | Cashier | ............. | G06K 9/00362 180/273 |
| 6,556,137 | B1 * | 4/2003 | Oka | ....................... | B60N 2/002 280/735 |
| 6,609,054 | B2 * | 8/2003 | Wallace | ............ | G06K 9/00362 180/271 |
| 7,212,894 | B2 * | 5/2007 | Hattori | .................. | B60N 2/002 180/273 |
| 7,216,895 | B2 * | 5/2007 | Hattori | ............. | B60N 2/002 180/273 |
| 7,567,184 | B2 * | 7/2009 | Betz | ................. | B60R 21/01516 180/273 |
| 7,739,925 | B2 * | 6/2010 | Foster | ..................... | A63G 4/00 73/865.8 |
| 7,983,817 | B2 * | 7/2011 | Breed | ................... | B60N 2/002 250/578.1 |
| 8,136,875 | B2 * | 3/2012 | Laake | .................. | B60N 2/753 297/188.14 |
| 9,730,518 | B1 * | 8/2017 | Jacobs | ................ | A47C 31/008 |
| 10,195,988 | B1 * | 2/2019 | Garza | ................ | G08B 21/0205 |
| 2003/0040858 | A1 * | 2/2003 | Wallace | ............. | G06K 9/00362 701/45 |
| 2004/0016577 | A1 * | 1/2004 | Lichtinger | ............ | B60N 2/002 177/144 |
| 2004/0249536 | A1 * | 12/2004 | Hattori | .................. | B60N 2/002 701/45 |
| 2005/0057026 | A1 * | 3/2005 | Hattori | ............. | B60R 21/01546 280/735 |
| 2005/0072249 | A1 * | 4/2005 | Maeda | .................. | B60N 2/002 73/862.046 |
| 2005/0090958 | A1 * | 4/2005 | Hattori | .................. | B60N 2/002 701/45 |
| 2005/0154515 | A1 * | 7/2005 | Wallace | ............ | G06K 9/00362 701/45 |
| 2005/0216158 | A1 * | 9/2005 | Sakai | .................... | B60N 2/002 701/45 |
| 2007/0204629 | A1 * | 9/2007 | Lofy | ..................... | B60N 3/104 62/3.61 |
| 2008/0204211 | A1 * | 8/2008 | Betz | ................. | B60R 21/01516 340/438 |
| 2009/0244551 | A1 * | 10/2009 | Lutz | ......................... | B65G 1/00 356/630 |
| 2010/0045454 | A1 | 2/2010 | Knight et al. | | |
| 2011/0012396 | A1 * | 1/2011 | Laake | .................... | B60N 2/753 297/188.14 |
| 2012/0169242 | A1 * | 7/2012 | Olson | ................ | H05B 37/0227 315/159 |
| 2012/0248987 | A1 * | 10/2012 | Zaveruha | ............ | F21V 23/0442 315/129 |
| 2012/0256492 | A1 * | 10/2012 | Song | ...................... | H02J 1/102 307/66 |
| 2012/0296487 | A1 * | 11/2012 | Leinen | ..................... | F24F 11/30 700/296 |
| 2014/0028836 | A1 * | 1/2014 | Lutz | ..................... | B65G 1/00 348/135 |
| 2016/0368398 | A1 * | 12/2016 | Fujii | ..................... | B60N 2/002 |
| 2017/0328612 | A1 * | 11/2017 | Lofy | ..................... | B60N 3/104 |
| 2018/0140097 | A1 * | 5/2018 | Adler | ........................ | G01L 5/00 |
| 2018/0271287 | A1 * | 9/2018 | Jacobs | ..................... | A47C 1/12 |
| 2018/0323645 | A1 * | 11/2018 | Wilberforce | ........ | H02J 13/0006 |
| 2018/0365550 | A1 * | 12/2018 | Brown | ................... | G06M 11/00 |

OTHER PUBLICATIONS

"DSP Group's Leading ULE/IoT Technology and Gemsense Leading IoT Platform Power Nowy Styl Group's Smart Chairs," DSP Group Press Release, available at http://www.dspg.com/press/dsp-groups-leading-uleiot-technology-gemsense-leading-iot-platform-power-nowy-styl-groups-smart-chairs/ (last visited May 9, 2017), 3 pages.
"Sensors: Chair Sensor," Cybermation Inc. website, available at http://www.cybermationinc.com/beclose-sensors-chair.html (last visited May 9, 2017), 1 page.
"Smart Pressure Sensor," In-Home Automation website, available at http://www.in-homeautomation.com/store/smart-pressure-sensor.html (last visited May 9, 2017), 2 pages.
"Vinyl Subject's Chair with Seat and Arm Activity Sensors," Lafayette Instrument website, available at https://lafayettepolygraph.com/products/vinyl-chair-arm-seat-sensor (last visited May 9, 2017), 4 pages.
"Wireless Smart Pressure Sensor Package (Includes Contact Sensor)," In-Home Automation website, available at http://www.in-homeautomation.com/store/wireless-smart-pressure-sensor-package-includes-contact-sensor.html (last visited May 9, 2017), 2 pages.

* cited by examiner

OCCUPANCY DETECTION SYSTEMS AND METHODS

FIELD

The present disclosure relates to systems and methods for occupancy detection. More specifically, the present disclosure relates to systems and methods for determining whether an object holder, such as a chair or a drink container holder, is occupied.

BACKGROUND

Many venues, such as arenas, stadiums, and concert halls, offer seating in the form of benches or chairs for hundreds, thousands, or tens of thousands of patrons. During an event at one of these venues, patrons often get out of their chairs and move around the venue (such as to purchase food or drink) before returning to their chairs and sitting down again. Many of the chairs at venues include drink container holders sized to hold patrons' drink containers.

SUMMARY

The present disclosure provides systems and methods for occupancy detection.

In various embodiments, the occupancy detection system includes a server and one or more occupancy detectors. The server is configured to wirelessly communicate with the occupancy detectors via a network. Generally, an occupancy detector includes or is otherwise associated with an object holder. At any given point in time, the object holder can have one of two occupancy states: (1) an occupied state in which an object occupies the object holder; and (2) an unoccupied state in which no object occupies the object holder. The occupancy detector includes one or more sensors and a controller configured to use sensor feedback to determine when the object holder changes occupancy states from the occupied state to the unoccupied state or from the unoccupied state to the occupied state. When the controller determines that the object holder changes occupancy states (i.e., determines that the object holder becomes occupied or unoccupied), the controller generates occupancy data that reflects this changed state. The occupancy detectors are configured to send this occupancy data to the server, which is configured to store the occupancy data in memory for analysis.

In one example embodiment, the occupancy detection system is deployed in an entertainment venue, such as a stadium, and includes tens of thousands of occupancy detectors in the form of or as part of chairs. Each chair includes an object holder in the form of a seat configured to support a person. Each chair also includes a controller and multiple sensors associated with the seat. At any given point in time, the seat can have one of two occupancy states: (1) an occupied state (e.g., a person sitting in the seat); and (2) an unoccupied state (e.g., an empty seat). In this example embodiment, for a given chair, the chair's controller monitors feedback from the chair's sensors to determine whether the chair's seat switches occupancy states from the unoccupied state to the occupied state (e.g., a person sits in the (previously unoccupied) seat) or from the occupied state to the unoccupied state (e.g., a person sitting in the seat stands up). Responsive to determining that the chair's seat switches occupancy states, the controller generates occupancy data indicating that the seat is occupied (or unoccupied) and sends the occupancy data to the server.

The server is configured to compile the occupancy data from all of the chairs for analysis. The server enables an operator of the occupancy detection system to view real-time or substantially real-time seating data that indicates which seats are occupied throughout the venue. The server also enables the operator to view trends over time, such as how often particular seats are occupied/unoccupied and for how long. The server also enables the operator to smartly allocate the venue's resources, such as food and drink kiosks and vendors, to better serve patrons and provide them a better experience.

Additional features and advantages are described in and will be apparent from the Detailed Description and the Figures.

DETAILED DESCRIPTION

Figure 1:
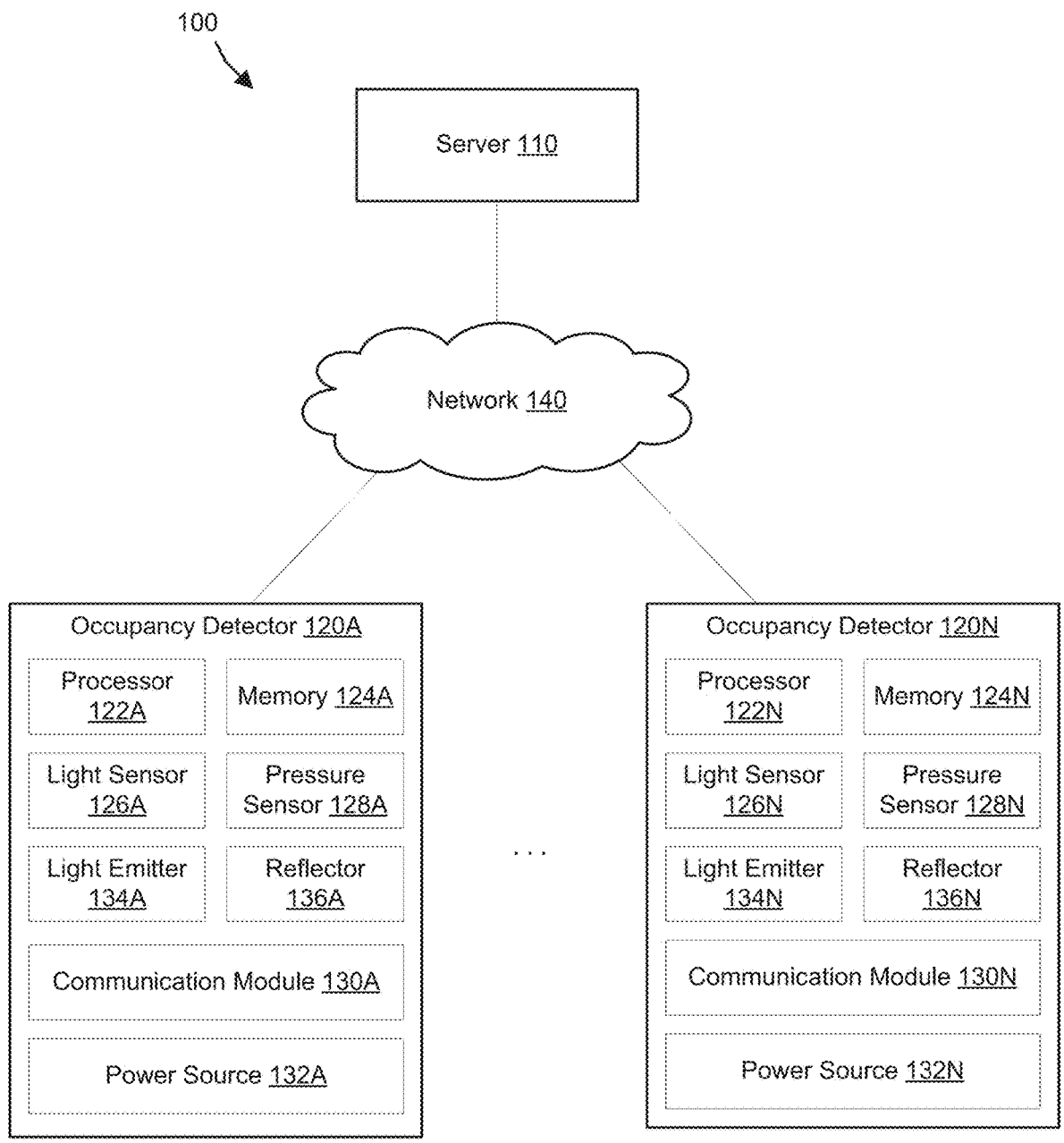
FIG. 1 is block diagram of one example embodiment of the occupancy detection system of the present disclosure.

Various embodiments of the present disclosure provide occupancy detection systems and methods.

In various embodiments, the occupancy detection system includes a server and one or more occupancy detectors. The server is configured to wirelessly communicate with the occupancy detectors via a network. Generally, an occupancy detector includes or is otherwise associated with an object holder. At any given point in time, the object holder can have one of two occupancy states: (1) an occupied state in which an object occupies the object holder; and (2) an unoccupied state in which no object occupies the object holder. The occupancy detector includes one or more sensors and a controller configured to use sensor feedback to determine when the object holder changes occupancy states from the occupied state to the unoccupied state or from the unoccupied state to the occupied state. When the controller determines that the object holder changes occupancy states (i.e., determines that the object holder becomes occupied or unoccupied), the controller generates occupancy data that reflects this changed state. The occupancy detectors are configured to send this occupancy data to the server, which is configured to store the occupancy data in memory for analysis.

In one example embodiment, the occupancy detection system is deployed in an entertainment venue, such as a stadium, and includes tens of thousands of occupancy detectors in the form of or as part of chairs. Each chair includes an object holder in the form of a seat configured to support a person. Each chair also includes a controller and multiple sensors associated with the seat. At any given point in time, the seat can have one of two occupancy states: (1) an occupied state (e.g., a person sitting in the seat); and (2) an unoccupied state (e.g., an empty seat). In this example embodiment, for a given chair, the chair's controller monitors feedback from the chair's sensors to determine whether the chair's seat switches occupancy states from the unoccupied state to the occupied state (e.g., a person sits in the (previously unoccupied) seat) or from the occupied state to the unoccupied state (e.g., a person sitting in the seat stands up). Responsive to determining that the chair's seat switches occupancy states, the controller generates occupancy data indicating that the seat is occupied (or unoccupied) and sends the occupancy data to the server. The occupancy data includes an occupied or unoccupied flag that indicates whether the chair's seat is occupied or unoccupied along with a seat identification number that uniquely identifies the seat.

The server is configured to compile the occupancy data from all of the chairs for analysis. The server enables an operator of the occupancy detection system to view real-time or substantially real-time seating data that indicates which seats are occupied throughout the venue. The server also enables the operator to view trends over time, such as how often particular seats are occupied/unoccupied and for how long. The server also enables the operator to smartly allocate the venue's resources, such as food and drink kiosks and vendors, to better serve patrons and provide them a better experience.

Turning now to FIG. 1, one example embodiment of the occupancy detection system 100, sometimes referred to as the "system" or the "system 100" for brevity, is shown. The occupancy detection system 100 includes a server 110 and multiple occupancy detectors 120A-120N. The server 110 is configured to wirelessly communicate with the occupancy detectors 120A-120N via a network 140. The occupancy detection system 100 may include any suitable quantity of occupancy detectors 120, ranging from one occupancy detector to hundreds of thousands of occupancy detectors. The occupancy detection system 100 may also include any suitable quantity of servers 110. The occupancy detectors may be the same as or different from one another.

The server 110 includes a user interface, a communication interface, and a controller including a processor and a memory (not shown).

The user interface of the server 110 enables a user to interact with the server 110. The user interface includes one or more input components, such as a computer mouse, a keyboard, and/or a touch-sensitive panel, and one or more output components, such as a display device (in one embodiment overlaid with the touch-sensitive panel) and/or a speaker.

The communication interface of the server 110 is configured to enable the server 110 to communicate with one or more other devices of the occupancy detection system 100 (e.g., the occupancy detectors 120A-N) or external to the occupancy detection system (e.g., an external computing device or mobile device). The communication interface is configured to transmit and/or receive various types of data, such as control data, seat occupancy data, or location data. In one embodiment, the communication interface includes a wired interface such as an Ethernet port, a USB port, and/or an HD-SDI port. In another embodiment, the communication interface includes a wireless interface such as a WiFi interface, a Bluetooth interface, or another suitable wireless protocol communication interface. The communication interface include suitable communication input and/or communication output interfaces.

The processor of the server 110 includes one or more general-purpose processors (e.g., microprocessors) and/or one or more special-purpose processors (e.g., digital signal processors). The memory of the server 110 includes one or more volatile and/or non-volatile storage components, such as magnetic, optical, flash, or organic storage, and may be integrated in whole or in part with the processor. In various embodiments, the memory includes removable and/or non-removable components.

Generally, the processor of the server 110 is configured to execute program instructions, (e.g., compiled or non-compiled program logic and/or machine code) stored in the memory to perform one or more of the functions described herein and/or shown in the accompanying drawings. As such, the memory may take the form of a non-transitory computer-readable storage medium, having stored thereon program instructions that, upon execution by the processor, cause a device to perform one or more of the steps described herein and/or shown in the accompanying drawings.

The network 140 may include any wired or wireless communication network configured to facilitate communication between the server 110 and the occupancy detectors 120A-N. In some embodiments, the network 140 is configured to facilitate communication via Bluetooth, Bluetooth low energy (BLE), Satellite, cellular network services, wireless local area network (WLAN), WiFi, WiMAX, ZigBee, IR, and/or radio.

The occupancy detectors 120A-N each include a controller including a processor 122A and a memory 124A, one or more sensors (here a light sensor 126A and a pressure sensor 128A), a communication module 130A, a power source 132A, a light emitter 134A, and a reflector 136A.

The processor 122A includes one or more general-purpose processors (e.g., microprocessors) and/or one or more special-purpose processors (e.g., digital signal processors). The memory 124A includes one or more volatile and/or non-volatile storage components, such as magnetic, optical, flash, or organic storage, and may be integrated in whole or in part with the processor. In various embodiments, the memory 124A includes removable and/or non-removable components.

Generally, the processor 122A is configured to execute program instructions, (e.g., compiled or non-compiled program logic and/or machine code) stored in the memory 124A to perform one or more of the functions described herein and/or shown in the accompanying drawings. As such, the memory 124A may take the form of a non-transitory computer-readable storage medium, having stored thereon program instructions that, upon execution by the processor, cause a device to perform one or more of the steps described herein and/or shown in the accompanying drawings.

The communication module 130 may include wired or wireless network interfaces configured to enable communication with the server 110 via the network 140. The communication module 130 is communicatively connected to the controller to enable the controller to communicate by controlling the communication module 130. In the illustrated example, the communication module 130 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); local area wireless network (including IEEE 802.11 a/b/g/n/ac or others); and/or Wireless Gigabit (IEEE 802.11ad), etc.). In some examples, the communications module 130 may include a wired or wireless interface (e.g., an auxiliary port, a Universal Serial Bus (USB) port, a Bluetooth® wireless node, etc.). The communications module 130A may further include one or more antennas configured to transmit and receive signals via one or more communication standards, including those listed above.

The power source 132A may be any electrical, mechanical, electromechanical, or other type of device configured to power the occupancy detector 120A. The power source 132A is directly or indirectly electrically connected to the components of the occupancy detector to power those components. In certain embodiments, the power source 132A includes a replaceable or a rechargeable battery. In other embodiments, in addition to or instead of a battery, the power source 132A includes an energy harvester configured to harvest or absorb energy from an external source and an energy storer configured to store the harvested energy for future use. In one embodiment, the energy harvester includes a radio frequency (RF) harvester configured to draw energy from ambient radio waves and/or a solar energy harvester configured absorb solar rays and convert them into energy. In one embodiment, the energy storer includes a supercapacitor configured to store the energy harvested by the energy harvester and to use it to power the various components of occupancy detector 120A. The supercapacitor may be a high capacity and high capacitance capacitor so it can receive and deliver power quicker than other types of capacitors and batteries. In other embodiments, the occupancy detector is configured to be electrically connected to a power grid, such as via a corded plug, instead of or in addition to including its own power source.

The light emitter 134A includes any device or system configured to emit a beam of light at any suitable wavelength, including infrared, visible, and others. Further, in certain embodiments the light emitter 134A is configured to emit a focused beam with a small cross section, and may target the reflector 136 (described below). In some embodiments, the light emitter 134A is movable, programmable, or otherwise configured to change the direction of the emitted light.

The reflector 136A includes any suitable material configured to reflect a beam of light emitted by the light emitter 134A, including metal, glass, plastic, a composite material, or any other reflective material.

Although not shown in FIG. 1, the one or more sensors are associated with an object holder, such as a seat of a chair as described below in association with FIG. 2. At any given point in time, the object holder can have one of two occupancy states: (1) an occupied state in which an object occupies the object holder; and (2) an unoccupied state in which no object occupies the object holder. Generally, each sensor is configured to generate signals responsive to detecting certain conditions in association with the object holder that correspond to the object holder being in the occupied state or the unoccupied state. Each sensor is (directly or indirectly) communicatively connected to the controller such that the sensor can send these signals to the processor.

More specifically, each sensor is configured to: (1) detect an occupied condition associated with the object holder being in the occupied state and, in response, generate and send an occupied signal to the controller; and (2) detect an unoccupied condition associated with the object holder being in the unoccupied state and, in response, generate and send an unoccupied signal to the controller. As described below, the controller uses these received occupied and unoccupied signals to determine whether the object holder changes occupancy states. The occupied and unoccupied conditions vary based on the type of sensor.

As noted above, the occupancy detector 120A includes two sensors: the pressure sensor 128A and the light sensor 126A.

The pressure sensor 128A is configured to detect an imposed pressure. Specifically, the pressure sensor 128A is configured to: (1) detect a pressure sensor occupied condition, here a detected pressure exceeding a predetermined threshold, and generate and send a pressure sensor occupied signal in response; and (2) detect a pressure sensor unoccupied condition, here the detected pressure falling below the threshold, and generate and send a pressure sensor unoccupied signal in response. The threshold may be set to a suitable value for the object holder with which the pressure sensor is associated. For instance, the threshold may be relatively large, such as 25 pounds, when the object holder is the seat of a chair but relatively small, such as 4 ounces, when the object holder is the bottom of a drink container holder. In various embodiments, the pressure sensor includes a piezoresistive strain gauge, capacitive, electromagnetic, piezoelectric, optical, potentiometric, or another type of device.

The light sensor 126A includes a photo detector configured to detect a beam of light and/or detect when an incoming beam of light is no longer present (i.e., a "break-beam" sensor). Specifically, the light sensor 126A is configured to: (1) detect a light sensor occupied condition, here the beam of light being broken, and generate and send a light sensor occupied signal in response; and (2) detect a light sensor unoccupied condition, here the light beam being unbroken, and generate and send a light sensor unoccupied signal in response. The light sensor may include any suitable type of detectors, such as photo-emissive cells, photo-conductive cells, photo-voltaic cells, and/or photo-junction devices.

These are merely two example sensors, and the occupancy detector may include different or additional sensors, such as a proximity sensor, an IR sensor, a temperature sensor, an accelerometer, a gyroscope, a position sensor, a rotary or linear encoder, a piezoelectric sensor, and/or an image sensor.

As indicated above, the controller is configured to receive the occupied and unoccupied signals and use them to determine whether the object holder changes occupancy states. Particularly, the controller is configured to use the occupied and unoccupied signals to determine whether: (1) an occupied-to-unoccupied state change condition is satisfied; and (2) an unoccupied-to-occupied state change condition is satisfied. Responsive to determining that the unoccupied-to-occupied state change condition is satisfied, the controller generates occupancy data representing that the object holder is now occupied and sends that occupancy data to the server 110. Conversely, responsive to determining that the occupied-to-unoccupied state change condition is satisfied, the controller generates occupancy data representing that the object holder is now unoccupied and sends that occupancy data to the server 110.

In embodiments in which only one sensor is associated with an object holder, the controller determines that the unoccupied-to-occupied state change condition is satisfied responsive to receiving the occupied signal from the sensor. Put differently, the controller designates the object holder as occupied responsive to the only sensor monitoring the object holder sensing a condition that corresponds to the object holder being occupied. Conversely, the controller determines that the occupied-to-unoccupied state change condition is satisfied responsive to receiving the unoccupied signal from the sensor. Put differently, the controller designates the object holder as unoccupied responsive to the only sensor monitoring the object holder sensing a condition that corresponds to the object holder being unoccupied.

In certain embodiments in which multiple sensors are associated with an object holder, the controller determines that the unoccupied-to-occupied state change condition is satisfied responsive to receiving the occupied signals from all of the sensors. Put differently, the controller designates the object holder as occupied responsive to all of the sensors monitoring the object holder sensing a condition that corresponds to the object holder being occupied. Conversely, the controller determines that the occupied-to-unoccupied state change condition is satisfied responsive to receiving the unoccupied signals from all of the sensors. Put differently, the controller designates the object holder as unoccupied responsive to all of the sensors monitoring the object holder sensing a condition that corresponds to the object holder being unoccupied.

In certain such embodiments, the controller determines that the unoccupied-to-occupied state change condition is satisfied responsive to receiving the occupied signals from all of the sensors and, thereafter, not receiving any unoccupied signals from any of the sensors within a designated period of time. That is, the controller waits for the designated period of time following receipt of the occupied signals before determining that the unoccupied-to-occupied state change condition is satisfied. This reduces false positives, especially for object detectors with a relatively low quantity of sensors. Similarly, in certain such embodiments, the controller determines that the occupied-to-unoccupied state change condition is satisfied responsive to receiving the unoccupied signals from all of the sensors and, thereafter, not receiving any occupied signals from any of the sensors within a designated period of time. That is, the controller waits for the designated period of time following receipt of the unoccupied signals before determining that the occupied-to-unoccupied state change condition is satisfied. This reduces false positives, especially for object detectors with a relatively low quantity of sensors. The designated periods of time may be any suitable periods of time, such as 1 second, 5 seconds, 30 seconds, or 60 seconds.

In certain embodiments in which multiple sensors are associated with an object holder, the controller determines that the unoccupied-to-occupied state change condition is satisfied responsive to receiving the occupied signals from at least a designated quantity of fewer than all of the sensors, such as more than 50% of the sensors or more than 75% of the sensors. Put differently, the controller designates the object holder as occupied responsive to at least the designated quantity of the sensors monitoring the object holder sensing a condition that corresponds to the object holder being occupied. Conversely, the controller determines that the occupied-to-unoccupied state change condition is satisfied responsive to receiving the unoccupied signals from at least a designated quantity of fewer than all of the sensors, such as more than 50% of the sensors or more than 75% of the sensors. Put differently, the controller designates the object holder as unoccupied responsive to at least the designated quantity of the sensors monitoring the object holder sensing a condition that corresponds to the object holder being unoccupied.

In various embodiments, the controller determines that the unoccupied-to-occupied state change condition is satisfied responsive to receiving the occupied signals from a designated sensor and at least a designated quantity of fewer than all of the remaining sensors. Put differently, the controller designates the object holder as occupied responsive to the designated sensor and at least the designated quantity of the remaining sensors monitoring the object holder sensing a condition that corresponds to the object holder being occupied. Conversely, the controller determines that the occupied-to-unoccupied state change condition is satisfied responsive to receiving the unoccupied signals from a designated sensor and at least a designated quantity of the remaining sensors. Put differently, the controller designates the object holder as unoccupied responsive to at least the designated sensor and the designated quantity of the remaining sensors monitoring the object holder sensing a condition that corresponds to the object holder being unoccupied. The designated sensor may be a sensor that has is better correlated with the correct occupancy status of the object holder than the other sensors.

Figure 2:
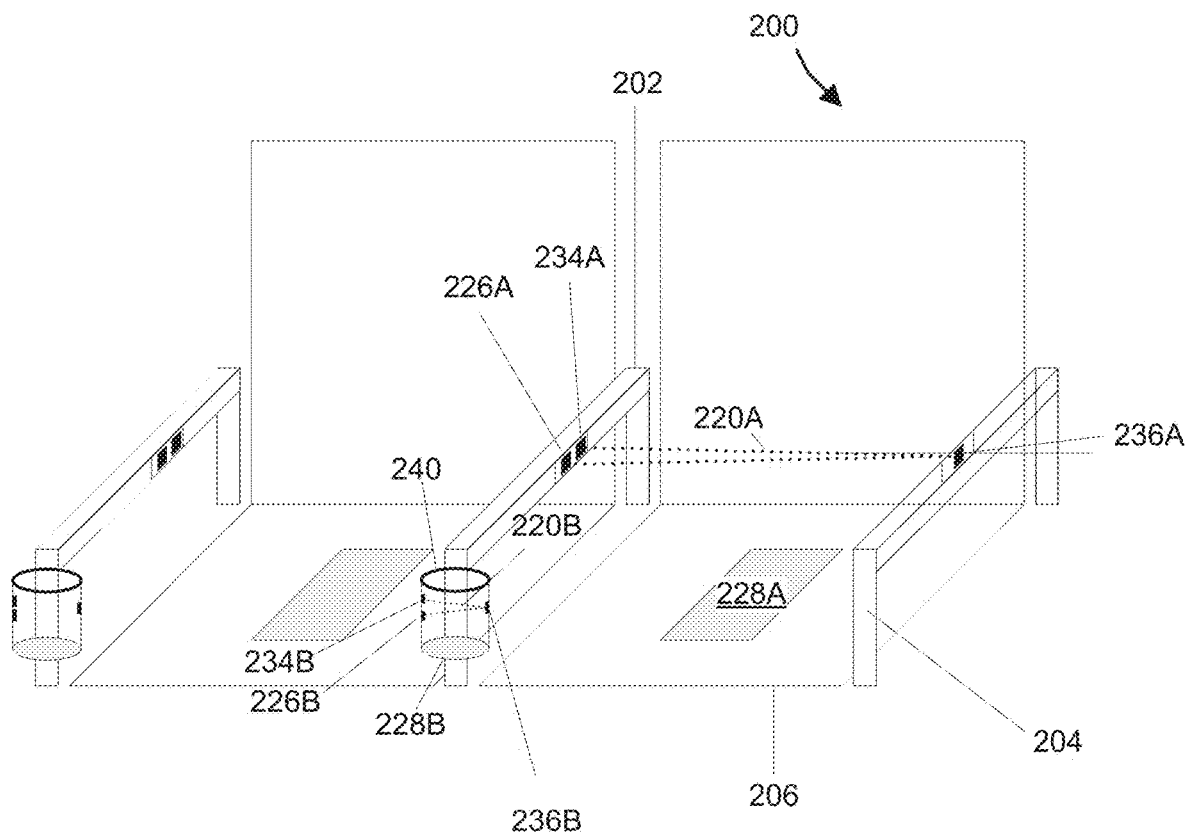
FIG. 2 is perspective view of two occupancy detectors of one example embodiment of the occupancy detection system of the present disclosure.

FIG. 2 illustrates an occupancy detector in the form of or part of a chair 200. The chair 200 includes a first arm 202, a spaced-apart second arm 204, a first object holder in the form of a seat 206 between the first and second arms 202 and 204, a first light emitter 234A, a first light sensor 226A, a first reflector 236A, a first pressure sensor 228A, a second object holder in the form of a drink container holder 240, a second light emitter 234B, a second light sensor 226B, a second reflector 236B, and a second pressure sensor 228B.

The first light sensor 226A and the first pressure sensor 228A are associated with the seat 206 and configured to generate signals responsive to detecting certain conditions in association with the seat that correspond to the seat being in the occupied state or the unoccupied state.

To facilitate this, the first light emitter 234A is attached to the inner side of the first arm 202 and oriented to emit a beam of light 220A across the seat 206 toward the second arm 204. In this example embodiment, the beam of light 220A is generally parallel to the seat 206. The first reflector 236A is attached to the inner side of the second arm 204 and oriented to reflect the beam of light 220A back toward the first light sensor 226A, which is also attached to the inner side of the first arm 202.

Additionally, the first pressure sensor 228A is attached to (such as embedded in) the seat 206 such that the first pressure sensor 228A can detect a pressure imposed by an object on the seat 206.

The second light sensor 226B and the second pressure sensor 228B are associated with the drink container holder 240 and configured to generate signals responsive to detecting certain conditions in association with the drink container holder that correspond to the drink container holder being in the occupied state or the unoccupied state.

To facilitate this, the second light emitter 234B is attached to the inner surface of the cylindrical side wall (not labeled) of the drink holder 240 and oriented to emit a beam of light 220B across the diameter of the side wall. In this example embodiment, the beam of light 220B is transverse to (such as perpendicular to) the longitudinal axis of the side wall. The second reflector 236B is attached to the inner surface of the side wall opposite the second light emitter 234B and oriented to reflect the beam of light 220B back toward the second light sensor 226B, which is also attached to the inner surface of the side wall near the second light emitter 234B.

Additionally, the second pressure sensor 228B is attached to (such as embedded in) the bottom wall (not labeled) of the drink container holder 240 such that the second pressure sensor 228B can detect a pressure imposed by an object on the bottom wall.

Figure 3:
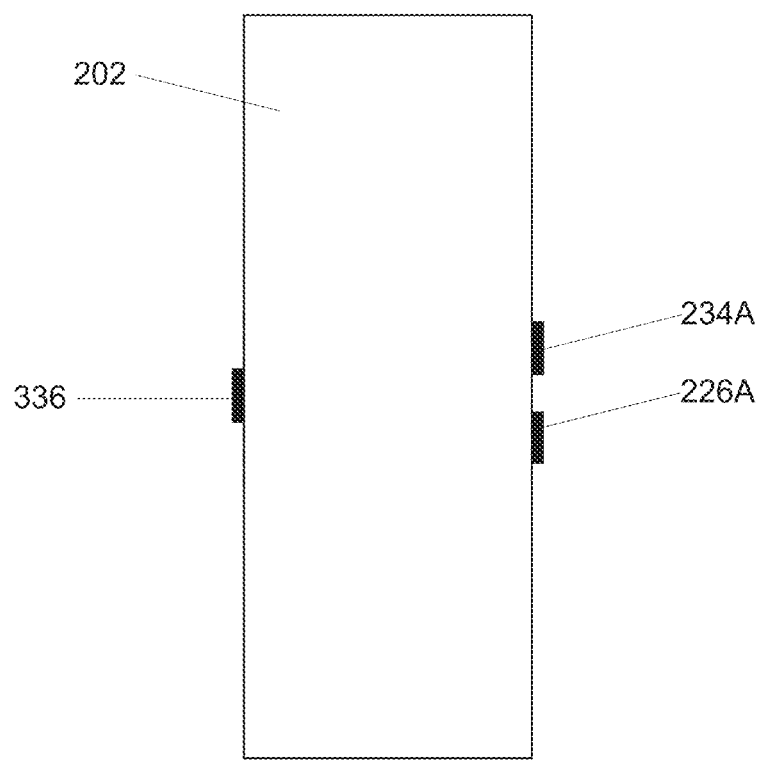
FIG. 3 is a top plan view of an arm of one of the occupancy detectors of FIG. 2.

In this embodiment, the chair 200 shares the first arm 202 with an adjacent chair (not labeled). As shown in FIG. 3, one side of the first arm 202 includes the first light emitter 134A and the first light sensor 126A on a first side while the opposite side of the first arm 202 includes a reflector 336 of the other chair.

The light emitters, light sensors, and reflectors may be covered by a housing that may be transparent, near transparent, and/or weatherproof for use outdoors.

In operation, the first light sensor 226A is configured to: (1) detect a first light sensor occupied condition, here the first light beam 220A being broken, and generate and send a first light sensor occupied signal to the controller in response; and (2) detect a first light sensor unoccupied condition, here the first light beam 220A being unbroken, and generate and send a first light sensor unoccupied signal in response. The first pressure sensor 128A is configured to: (1) detect a first pressure sensor occupied condition, here a detected pressure exceeding 25 pounds, and generate and send a first pressure sensor occupied signal to the controller in response; and (2) detect a first pressure sensor unoccupied condition, here the detected pressure falling below 25 pounds, and generate and send a first pressure sensor unoccupied signal in response.

Similarly, the second light sensor 226B is configured to: (1) detect a second light sensor occupied condition, here the beam of light 220B being broken, and generate and send a second light sensor occupied signal to the controller in response; and (2) detect a second light sensor unoccupied condition, here the second light beam 220B being unbroken, and generate and send a second light sensor unoccupied signal in response. The second pressure sensor 128B is configured to: (1) detect a second pressure sensor occupied condition, here a detected pressure exceeding 4 ounces, and generate and send a second pressure sensor occupied signal to the controller in response; and (2) detect a second pressure sensor unoccupied condition, here the detected pressure falling below 4 ounces, and generate and send a second pressure sensor unoccupied signal in response.

When the seat 206 is unoccupied and a person (who weighs more than 25 pounds) sits down on the seat 206, the person blocks the first light beam 220A. The first light sensor 226A detects that the first light beam 220A is broken (i.e., detects the first light sensor occupied condition) and generates and sends the first light sensor occupied signal to the controller in response. Additionally, the first pressure sensor 228A detects a pressure on the seat 206 that exceeds 25 pounds (i.e., detects the first pressure sensor occupied condition), and generates and sends the first pressure sensor occupied signal to the controller in response. After receiving these signals, the controller determines that the unoccupied-to-occupied state change condition is satisfied for the seat 206, generates occupancy data indicating that the seat 206 is occupied, and sends the occupancy data to the server.

While in the seat 206, the person buys a bottle of cola from a vendor and inserts it into the drink container holder 240. The bottle blocks the second light beam 220B. The second light sensor 226B detects that the second light beam 220B is broken (i.e., detects the second light sensor occupied condition) and generates and sends the second light sensor occupied signal to the controller in response. Additionally, the second pressure sensor 228B detects a pressure on the bottom wall of the drink container holder 240 that exceeds 4 ounces (i.e., detects the second pressure sensor occupied condition), and generates and sends the second pressure sensor occupied signal to the controller in response. After receiving these signals, the controller determines that the unoccupied-to-occupied state change condition is satisfied for the drink container holder 240, generates occupancy data indicating that the drink container holder 240 is occupied, and sends the occupancy data to the server.

The person then stands up from the seat 206 to buy a hot dog. The person no longer blocks the first light beam 220A, and the first light sensor 226A detects that the first light beam 220A is unbroken (i.e., detects the first light sensor unoccupied condition) and generates and sends the first light sensor unoccupied signal to the controller in response. Additionally, the first pressure sensor 228A detects that the pressure on the seat 206 has fallen below 25 pounds (i.e., detects the first pressure sensor unoccupied condition), and generates and sends the first pressure sensor unoccupied signal to the controller in response. After receiving these signals, the controller determines that the occupied-to-unoccupied state change condition is satisfied for the seat 206, generates occupancy data indicating that the seat 206 is unoccupied, and sends the occupancy data to the server.

The person decides to bring his bottle of cola with him, to the hot dog stand, and removes it from the drink container holder 240. The bottle no longer blocks the second light beam 220B, and the second light sensor 226B detects that the second light beam 220B is unbroken (i.e., detects the second light sensor unoccupied condition) and generates and sends the second light sensor unoccupied signal to the controller in response. Additionally, the second pressure sensor 228B detects that the pressure on the bottom wall of the drink container holder 240 has fallen below exceeds 4 ounces (i.e., detects the second pressure sensor unoccupied condition), and generates and sends the second pressure sensor unoccupied signal to the controller in response. After receiving these signals, the controller determines that the occupied-to-unoccupied state change condition is satisfied for the drink container holder 240, generates occupancy data indicating that the drink container holder 240 is unoccupied, and sends the occupancy data to the server.

This is merely one example configuration, and the present disclosure contemplates other locations of the chair's components. For instance, the pressure sensor may be located on the back of the chair. In another embodiment in which the seat is pivotable between a generally vertical stored position and a generally horizontal use position, the chair includes an accelerometer or other position sensor configured to determine which position the seat is in (movement to the stored position corresponding to an unoccupied condition and movement to the use position corresponding to an occupied condition). The first light emitter, the first reflector, and the first light sensor may be positioned at any suitable location such that the first light beam crosses the seat at a suitable location, such as near the middle of the seat or the back of the seat. The pressure sensor may be positioned in the middle of seat 206, or toward one of the side, front, or back edges of the seat. Multiple pressure sensors may be employed.

In some embodiments, the pressure sensor is sensitive enough to detect small changes in pressure, corresponding to, for instance, the weight of the object occupying the drink container holder, and communicates those changes to the controller. This enables the controller or the server to, for instance, monitor how quickly the patron is drinking her beverage.

In some embodiments, a sensor periodically sends a signal representing the occupied condition or the unoccupied condition being satisfied, such as every hundredth or tenth of a second. In other embodiments, a sensor sends a signal responsive to sensing the occupied condition or the unoccupied condition and doesn't send another signal until the condition changes.

In certain embodiments, each object detector is assigned or otherwise associated with a unique identifier, and sends that unique identifier along with occupancy data to the server. This enables the server to decipher the particular occupancy detector that sent the occupancy data.

In various embodiments, each object detector includes a global positioning system (GPS) receiver configured to communicate with GPS satellites and determine (with or without the help of the controller) the object detector's location on Earth. In certain embodiments, the controller periodically sends location data representing the object detector's location to the server (such as when the controller sends the server occupancy data).

In some embodiments there may be only a light emitter on one arm and a light sensor on the other arm. There may be no use of a reflector. In further examples, one or more systems may include a proximity sensor in addition to or instead of a pressure sensor and light sensor. The proximity sensor may be placed on the arm, seat, or other part of the chair and may detect changes in an electromagnetic field surrounding the sensor caused by the presence of a person.

In certain embodiments, the object detector is not a chair, but rather a retrofit device configured to be overlaid atop an existing chair and provide that chair with the above-described functionality. The retrofit device may include, for instance, a back covering, arm coverings, and/or a seat covering.

In various embodiments, the controller sends a time stamp along with the occupancy data.

The server is configured to store occupancy data it receives from the object detectors.

In various embodiments, the server uses the occupancy data to determine, at any given point time, whether each object holder in the occupancy detection system is occupied or unoccupied. The server may display a map that visualizes this by, for instance, displaying an icon for each object holder (at its proper relative location) and color coding that icon to an occupied or an unoccupied status (e.g., green and red, respectively).

In various embodiments, the server can use the occupancy data, and particularly the time stamps sent along with the occupancy data, to determine average occupancy times for individual object holders or groups of object holders. For instance, for a particular object holder and for a particular time period (e.g., while an event is occurring at a venue in which the object holder is located), the server can determine the length of time the object holder was occupied during that time period and the average length of time the object holder was occupied before becoming unoccupied.

The operator of the occupancy detection system can use this information to allocate resources to provide a better patron experience. For instance, if the operator determines that people in a first section of seating stay in their seats much longer (on average) than people in the other sections of seating, the operator can deploy more vendors to the first section of seating to ensure those peoples' needs are met. In another example, if the operator determines that people in a second section of seating stay out of their seats much longer (on average) than people in the other sections of seating, the operator can move food and drink kiosks closer to that second section. In another example, the operator can deploy vendors to a particular section of seating after determining that a certain amount of cup holders in that section transitioned from occupied to unoccupied.

In some examples, the operator of the occupancy detection system can use this information to determine when one section experiences an abnormality. For instance, where a particular section has a high number of occupied seats and then in a short period of time has an abnormally low number (e.g., due to people in the section standing up due to a disturbance such as a fight between two people in the section), the operator can turn on a camera focused on that particular section, dispatch security, provide an alert to one or more appropriate personnel, or take some other action.

The server may be configured to automatically take an action based on received information, including occupancy data. For instance, in response to detecting an occupancy abnormality, the server may automatically send an alert. Further, in response to a higher than average number of empty cup holders in a section, the server may automatically send an alert to a vendor indicating that the section is in need of additional vendors. Vendors may have mobile devices that can communicate with the server to receive such alerts.

In certain embodiments, the object detectors each include an radio frequency identification (RFID) chip. The RFID chip may be used by a vendor or other personnel to identify the particular object detector. For instance, a person may order food or drink from a vendor remotely via a smart phone app or other wireless device. The vendor may use a scanner (such as a standalone device or a scanner integrated into her cell phone) to search for the RFID chip to identify which chair corresponds to the ordered food or drink, and to guide the vendor to the particular chair.

In various embodiments, the controller of the object detector relays the signals received from the sensors to the server, which uses those signals to determine whether the occupancy state of the object detector has changed. In other words, in certain embodiments the servers have the functionality of the object detectors.

Various modifications to the above-described embodiments will be apparent to those skilled in the art. These modifications can be made without departing from the spirit and scope of this present subject matter and without diminishing its intended advantages. Not all of the depicted components described in this disclosure may be required, and some implementations may include additional, different, or fewer components as compared to those described herein. Variations in the arrangement and type of the components; the shapes, sizes, and materials of the components; and the manners of attachment and connections of the components may be made without departing from the spirit or scope of the claims set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. An occupancy detection system comprising:
   a first sensor configured to generate a first sensor occupied signal responsive to detecting a first occupied condition of a chair;
   a second sensor configured to generate a second sensor occupied signal responsive to detecting a second occupied condition of the chair;
   a third sensor configured to generate a third sensor occupied signal responsive to detecting a third occupied condition of a drink container holder corresponding to the chair;
   a fourth sensor configured to generate a fourth sensor occupied signal responsive to detecting a fourth occupied condition of the drink container holder corresponding to the chair, and
   a processor communicatively connected to the first sensor, the second sensor, the third sensor, and the fourth sensor, and configured to:
      responsive to receiving the first sensor occupied signal from the first sensor and the second sensor occupied signal from the second sensor during a predetermined time period, determine that a first unoccupied-to-occupied state change condition of the chair is satisfied and that the chair changed occupancy states from an unoccupied state to an occupied state and generate first occupancy data representing that the chair is in the occupied state; and responsive to receiving at least one of the third sensor occupied signal and the fourth sensor occupied signal;

determine that a second unoccupied-to-occupied state change condition of the drink container holder corresponding to the chair is satisfied and that the drink container holder changed occupancy states from an unoccupied state to an occupied state;

generate second occupancy data representing that the drink container holder is in the occupied state; and determine, based on first data captured by the at least one of the third sensor and the fourth sensor at a first point in time, compared to second data captured by the at least one of the third sensor and the fourth sensor at a second subsequent point in time, a rate of consumption of a drink in the drink container holder.

2. The occupancy detection system of claim 1, further comprising a light emitter configured to emit a beam of light, and wherein the first sensor comprises a light sensor.

3. The occupancy detection system of claim 2, wherein the first occupied condition comprises the beam of light being broken.

4. The occupancy detection system of claim 3, wherein the second sensor comprises a pressure sensor.

5. The occupancy detection system of claim 4, wherein the second occupied condition comprises a detected pressure exceeding a threshold.

6. The occupancy detection system of claim 1, wherein the processor is further configured to determine that the first unoccupied-to-occupied state change condition is satisfied and to generate the first occupancy data representing that the chair is in the occupied state responsive to: (1) receiving the first sensor occupied signal and the second sensor occupied signal; and (2) thereafter, not receiving a first sensor unoccupied signal or a second sensor unoccupied signal within a first designated period of time.

7. The occupancy detection system of claim 1, further comprising a wireless communication interface, wherein the processor is further configured to send, via the wireless communication interface, the first occupancy data to a computing device.

8. The occupancy detection system of claim 1, further comprising a light emitter configured to emit a beam of light, and wherein the third sensor comprises a light sensor.

9. The occupancy detection system of claim 8, wherein the third occupied condition comprises the beam of light being broken.

10. The occupancy detection system of claim 9, wherein the fourth sensor comprises a pressure sensor.

11. The occupancy detection system of claim 10, wherein the fourth occupied condition comprises a detected pressure exceeding a threshold.

12. The occupancy detection system of claim 1, further comprising a power source configured to power the first sensor, the second sensor, the third sensor, the fourth sensor, and the processor.

13. The occupancy detection system of claim 12, wherein the power source comprises an energy harvester configured to harvest energy and an energy storer configured to store the energy.

14. The occupancy detection system of claim 13, wherein the energy storer comprises a supercapacitor.

15. The occupancy detection system of claim 14, wherein the energy harvester includes a radio-frequency energy harvester.

16. The occupancy detection system of claim 1, further comprising a light emitter configured to emit a beam of light, wherein the first sensor comprises a light sensor,
wherein the first occupied condition comprises the beam of light being broken,
wherein the second sensor comprises a pressure sensor,
wherein the second occupied condition comprises a detected pressure exceeding a threshold, and
wherein the processor is further configured to:
determine that the first unoccupied-to-occupied state change condition is satisfied and to generate the first occupancy data representing that the chair is in the occupied state responsive to: (1) receiving the first sensor occupied signal and the second sensor occupied signal; and (2) thereafter, not receiving a first sensor unoccupied signal or a second sensor unoccupied signal within a first designated period of time.

17. The occupancy detection system of claim 1, wherein second sensor comprises a plurality of second sensors, and wherein the processor is configured to determine that the unoccupied-to-occupied state change is satisfied responsive to receiving a plurality of sensor occupied signals from at least a threshold quantity of at least two of the plurality of second sensors, and wherein the threshold quantity of the plurality of second sensors is less than all available second sensors.

18. A system comprising:
a plurality of occupancy detectors, wherein each occupancy detector includes:
a first sensor configured to generate a first sensor occupied signal responsive to detecting a first occupied condition; and
a second sensor configured to generate a second sensor occupied signal responsive to detecting a second occupied condition; and
a processor communicatively connected to the first sensor and the second sensor and configured to:
responsive to receiving the first sensor occupied signal from the first sensor and a second sensor occupied signal from the second sensor during a predetermined time period, determine that an unoccupied-to-occupied state change condition is satisfied and that an object holder changed occupancy states from an unoccupied state to an occupied state;
generate occupancy data representing that the object holder is in the occupied state; and
transmit the occupancy data; and
a server configured to:
receive the occupancy data from the plurality of occupancy detectors;
cause a display device to display a map associated with the occupancy data received from the plurality of occupancy detectors;
determine, based on the occupancy data from the plurality of occupancy detectors, a suggested allocation of resources of a venue in which the system operates; and
cause the display device to display the determined suggested allocation of resources.

19. The system of claim 18, wherein:
the plurality of occupancy detectors correspond to drink container holders,
each of the plurality of occupancy detectors is further configured to detect a threshold change in pressure for a respective drink container holder based on data from at least one of the first sensor and the second sensor, and
the server is further configured to:
  determine that a threshold quantity of the drink container holders in a target section of the venue have detected the threshold change in pressure; and
  responsively provide an electronic alert to one or more vendors operating in the venue indicating that the target section requires additional resources.

* * * * *